United States Patent
Seibel (10) Patent No.: US 6,347,804 B1
(45) Date of Patent: Feb. 19, 2002

(54) MOTORCYCLE ACCESSORY QUICK-RELEASE ATTACHMENT ASSEMBLY

(75) Inventor: Michael Seibel, Wichita, KS (US)

(73) Assignee: Big Dog Motorcycles, L.L.C., Wichita, KS (US)

( * ) Notice: Subject to any disclaimer, the term of this patent is extended or adjusted under 35 U.S.C. 154(b) by 0 days.

(21) Appl. No.: 09/369,691

(22) Filed: Aug. 6, 1999

(51) Int. Cl.[7] .................................................. B62J 1/00
(52) U.S. Cl. ........................... 280/288.4; 280/304.5; 180/219; 292/106; 292/207; 292/208
(58) Field of Search .......................... 280/288.4, 304.5, 280/202; 180/219; 224/413, 419, 423; 292/104, 106, 205, 207, 208

(56) References Cited

U.S. PATENT DOCUMENTS

| 88,318 | A | * | 3/1869 | McGregor et al. | 292/229 |
|---|---|---|---|---|---|
| 3,746,392 | A | | 7/1973 | German | 297/380 |
| 3,791,563 | A | | 2/1974 | Raat | 224/34 R |
| 3,795,354 | A | | 3/1974 | Stippich | 224/32 A |
| 4,032,189 | A | | 6/1977 | Benavente et al. | 297/352 |
| 4,096,980 | A | | 6/1978 | Clow | 224/39 |
| 4,174,796 | A | | 11/1979 | Nakamura | 224/39 |
| 4,257,544 | A | | 3/1981 | Dierkes | 224/32 A |
| 4,522,442 | A | | 6/1985 | Takenaka | 296/37.1 |
| 4,747,612 | A | * | 5/1988 | Kuhn | 280/460 |
| 4,759,580 | A | | 7/1988 | Berklich, Jr. et al. | 296/65 R |
| 4,773,693 | A | | 9/1988 | Premji et al. | 296/65.1 |
| 4,826,057 | A | | 5/1989 | Yamada | 224/32 A |
| 4,993,731 | A | | 2/1991 | Fuller | 280/202 |
| 5,297,407 | A | * | 3/1994 | Tarr | 70/232 |
| 5,322,345 | A | | 6/1994 | Desser et al. | 297/214 |
| 5,443,239 | A | | 8/1995 | Laporte | 248/503.1 |
| 5,465,882 | A | | 11/1995 | Shinohara | 224/39 |
| 5,558,260 | A | | 9/1996 | Reichert | 224/413 |
| 5,577,854 | A | | 11/1996 | Jacob et al. | 403/2 |
| 5,664,715 | A | | 9/1997 | Gogan et al. | 224/413 |
| 5,667,232 | A | * | 9/1997 | Gogan et al. | 280/202 |
| 5,673,833 | A | | 10/1997 | Ortlieb | 224/425 |
| 5,775,454 | A | * | 7/1998 | Scherbarth et al. | 180/219 |
| 5,881,835 | A | * | 3/1999 | Lucht et al. | 180/219 |
| 6,073,948 | A | * | 6/2000 | Motojima | 280/152.2 |
| 6,099,017 | A | * | 8/2000 | Schooler | 280/510 |

OTHER PUBLICATIONS

"Ghost Brackets—Revolutionary Saddlebag Installation and Removal System", product brochure of CBZ Enterprizes, Ceres, California, Jan. 1999.

"Windshields for American Motorcycles", product brochure of Memphis Shades, 1999, p. 19.

"H–D's Mix and Match—Installing Multiple Detachable Kits", John Sullivan, *Hot Rod Bikes*, Nov. 1998, pp. 79–82.

Harley–Davidson 1997 Genuine Motor Accessories & Genuine Motor Parts Catalog, pp. 6–21.

(List continued on next page.)

*Primary Examiner*—Robert P. Olszewski
*Assistant Examiner*—Michael Cuff
(74) *Attorney, Agent, or Firm*—Stinson, Mag & Fizzell, P.C.

(57) ABSTRACT

A motorcycle accessory quick-release attachment assembly is provided which consists of two or more motorcycle accessories adapted to be releasably attached to the same set of mounting studs without the use of tools. In a preferred embodiment, each motorcycle accessory includes one or more front hooks for mounting on the front mounting studs, one or more rear hooks for mounting on the rear mounting studs, and one or more latches rotatably connected to the rear hooks for securing and releasing the rear hooks to and from the rear mounting studs. Significantly, the configuration of the latches allows the accessories to be releasably attached to the same set of mounting studs. Each of the latches may be configured to receive a padlock to lock the rear hooks to the rear mounting studs. As such, the accessories can be optionally locked to the motorcycle to guard against theft.

13 Claims, 6 Drawing Sheets

OTHER PUBLICATIONS

"Installation Instructions for KüryAkyn™ Detachable Sissy Bar Side Straps", product brochure of KüryAkyn™ Holdings, Stillwater, Minnesota, Sep. 1994.

"Plug N' Play—Removable Backrest Bracket", product brochure of JB Fabrication, Inc., Dallas, Texas.

* cited by examiner

MOTORCYCLE ACCESSORY QUICK-RELEASE ATTACHMENT ASSEMBLY

BACKGROUND OF THE INVENTION

1. Field of the Invention

The present invention relates to motorcycle accessories and, in particular, to motorcycle accessories which can be releasably attached to a motorcycle without the use of tools and/or which can be locked to the motorcycle to guard against theft.

2. Description of Related Art

Many different types of motorcycle accessories can be attached to and/or detached from a motorcycle for the purpose of changing the functionality or "look" of the motorcycle. For example, at times, the owner of a motorcycle may wish to attach a passenger backrest (commonly referred to as a "sissy bar") to the motorcycle for the comfort of a passenger. At other times, the owner may wish to transport groceries, luggage, camping gear, or other cargo and, thus, may wish to attach saddlebags, a luggage rack, and/or a travel trunk to the motorcycle. Still at other times, the owner may wish to detach all of the accessories from the motorcycle for a sleek "bare-bones" look.

Traditionally, one of the most common ways to attach motorcycle accessories to a motorcycle was to bolt, screw, or otherwise permanently attach the accessories to various attachment points on the motorcycle. Therefore, to customize a motorcycle, the owner of the motorcycle would have to use a wrench, a screwdriver, or other tools to attach and/or detach an accessory. One problem with this attachment/detachment method is that the necessary tools may not be readily available to the owner of the motorcycle, such as when he/she is touring on the open road. In addition, the attachment/detachment of the accessory in this manner can be tedious and time-consuming, particularly if the attachment points are located behind the fender strut, underneath the seat, or in other inaccessible locations on the motorcycle. Yet another problem is that the mounting hardware for the accessory can easily be lost or misplaced during the attachment/detachment process.

In an effort to overcome these problems, motorcycle accessories have been developed which can be releasably attached to a motorcycle without the use of tools. For example, some motorcycle accessories have been designed to include a latch which is moveable between a closed position to securely attach the accessory to the motorcycle and an open position to allow detachment of the accessory from the motorcycle. Examples of such latches are shown in U.S. Pat. No. 4,993,731, U.S. Pat. No. 5,664,715, and U.S. Pat. No. 5,673,833. While these accessories can be quickly and easily attached to and/or detached from a motorcycle, they can just as quickly and easily be stolen from the motorcycle while the owner is eating inside a restaurant, paying for gas, or doing any other type of everyday activity. In addition, only one accessory can be releasably attached to the same mounting location on the motorcycle at any one time so that any additional accessories must be attached, if possible, to the motorcycle at a different mounting location.

Other types of motorcycle accessories which can be releasably attached to a motorcycle use a padlock or other type of locking device to releasably secure the accessory to the motorcycle. Examples of such locks are shown in U.S. Pat. No. 5,558,260 and U.S. Pat. No. 4,257,544. While the locks of these accessories guard against theft, there is still a problem in that only one accessory can be releasably attached to the same mounting location on the motorcycle. In addition, these accessories use the locking feature of the device to secure the accessory to the motorcycle such that the accessory cannot be secured to the motorcycle unless it is also locked in place. This mandatory locking feature may be undesirable to certain motorcycle owners due to the fact that the owner must necessarily keep track of one or more keys or other unlocking devices in order to attach and/or detach an accessory.

Therefore, an objective of the present invention is to provide a motorcycle accessory attachment assembly which is designed to releasably attach more than one accessory to the same mounting location on a motorcycle. Another objective of the present invention is to provide a motorcycle accessory which can be locked to a motorcycle to guard against theft. A further objective of the present invention is to provide a motorcycle accessory which can be releasably attached to a motorcycle and optionally locked thereto.

SUMMARY OF THE INVENTION

These and other objectives are met by the motorcycle accessory quick-release attachment assembly of the present invention. This assembly generally comprises two or more motorcycle accessories which can be releasably attached side by side to mounting studs without the use of tools.

In a preferred embodiment, the accessories are releasably attached to front and rear mounting studs installed on the rear fender of a motorcycle. The mounting studs each consist of an elongated bolt which extends through the fender strut and is secured in place with a nut on the inside of the strut. Mounted to the bolt on the outside of the fender strut is a metallic spacer tube, and stacked onto the spacer tube are inner and outer plastic mounting rings separated by a plurality of metallic spacers. The mounting rings each have an annular groove formed therein for receiving one of the two motorcycle accessories.

In an exemplary embodiment, a passenger backrest and a pair of saddlebags are releasably attached to the front and rear mounting studs, wherein the passenger backrest is mounted on the inner mounting rings of the mounting studs and the saddlebags are mounted on the outer mounting rings of the mounting studs. The passenger backrest is configured to extend upwardly from a right side plate and a left side plate, wherein each of the side plates has a front hook for mounting on the front inner mounting rings and a rear hook for mounting on the rear inner mounting rings. Similarly, each of the saddlebags has an outer side plate with a front hook for mounting on the front outer mounting rings and a rear hook for mounting on the rear outer mounting rings.

The side plates of the passenger backrest and saddlebags each have a novel latch mechanism connected to the rear hook thereof. Each of the latches is rotatable between a closed position to secure the rear hook to the rear mounting stud and an open position to release the rear hook from the rear mounting stud. The relatively narrow thickness of the latches allows the passenger backrest and saddlebags to be releasably attached side by side to the same set of mounting studs on the motorcycle.

In a related aspect of the preferred embodiment, each of the latches is configured to receive a padlock to lock the rear hooks to the rear mounting studs. As such, the passenger backrest and saddlebags can be optionally locked to the motorcycle to guard against theft.

The present invention will be better understood from the following description of the invention, read in connection with the drawings as hereinafter described.

DESCRIPTION OF THE INVENTION

The present invention is a motorcycle accessory quick-release attachment assembly which generally comprises two or more motorcycle accessories adapted to be releasably attached side by side to the same set of mounting studs without the use of tools. In a preferred embodiment, the accessories are releasably attached to front and rear mounting studs installed on the rear fender of a motorcycle, and a novel latch mechanism allows both of the accessories to be releasably attached to the same set of mounting studs. Although the preferred embodiment will hereinafter be described and illustrated with respect to the attachment of a passenger backrest and a pair of saddlebags, it is to be understood that the invention could also be used in connection with a luggage rack, a travel trunk, or any other type of detachable motorcycle accessory.

Figures 1, 2, 3:
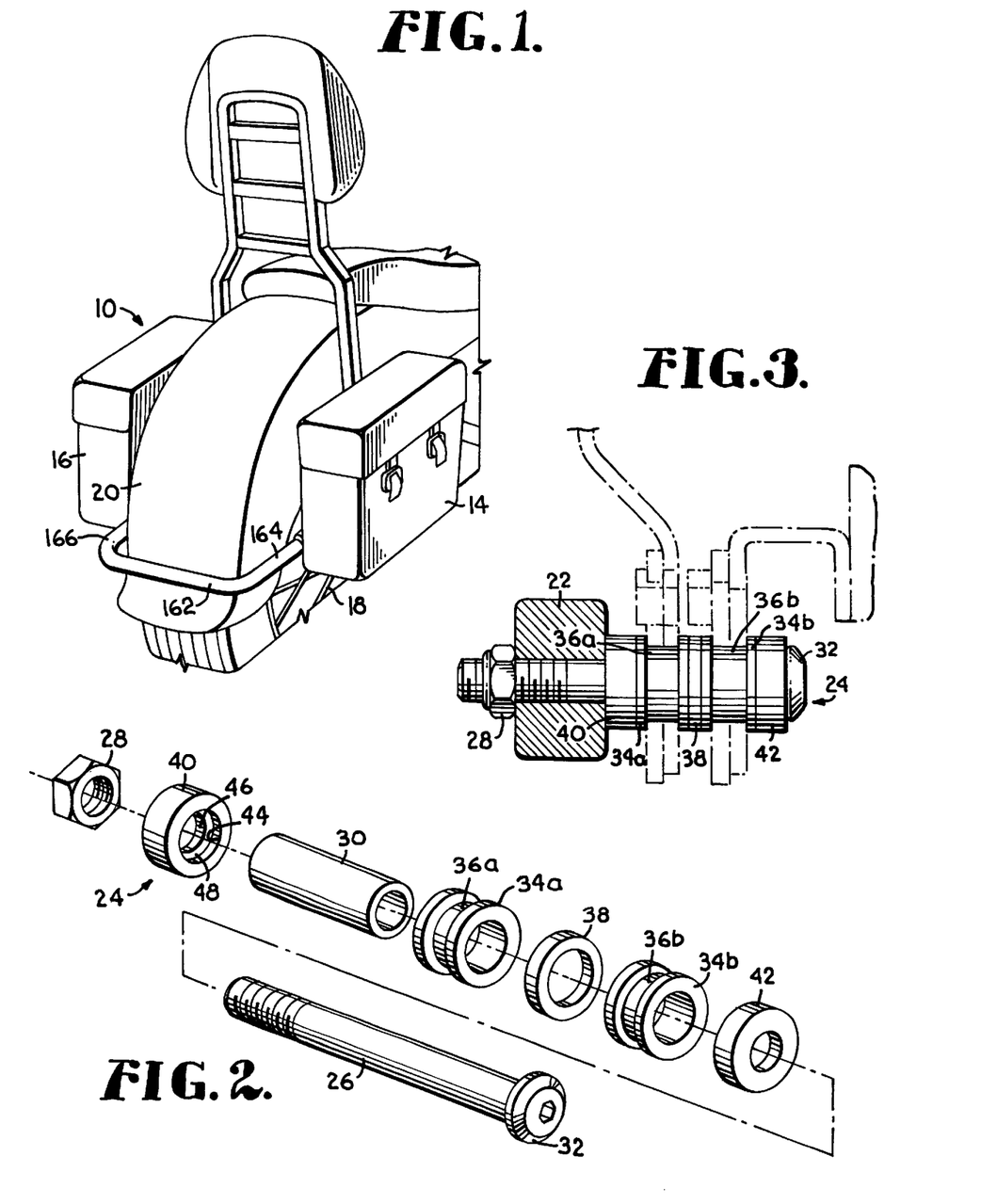
FIG. 1 is a perspective view of an exemplary embodiment of the motorcycle accessory quick-release attachment assembly of the present invention, showing a passenger backrest and saddlebags releasably attached and locked to a motorcycle.
FIG. 2 is an exploded perspective view of one of the mounting studs of the motorcycle accessory quick-release attachment assembly of FIG. 1.
FIG. 3 is an enlarged side view of one of the mounting studs of the motorcycle accessory quick-release attachment assembly of FIG. 1.

Referring to FIG. 1, an example of the preferred embodiment of the motorcycle accessory quick-release attachment assembly of the present invention is designated generally as reference numeral 10. Assembly 10 includes a passenger backrest 12 and a pair of saddlebags 14 and 16 releasably attached to mounting studs installed on a motorcycle 18.

Figure 4:
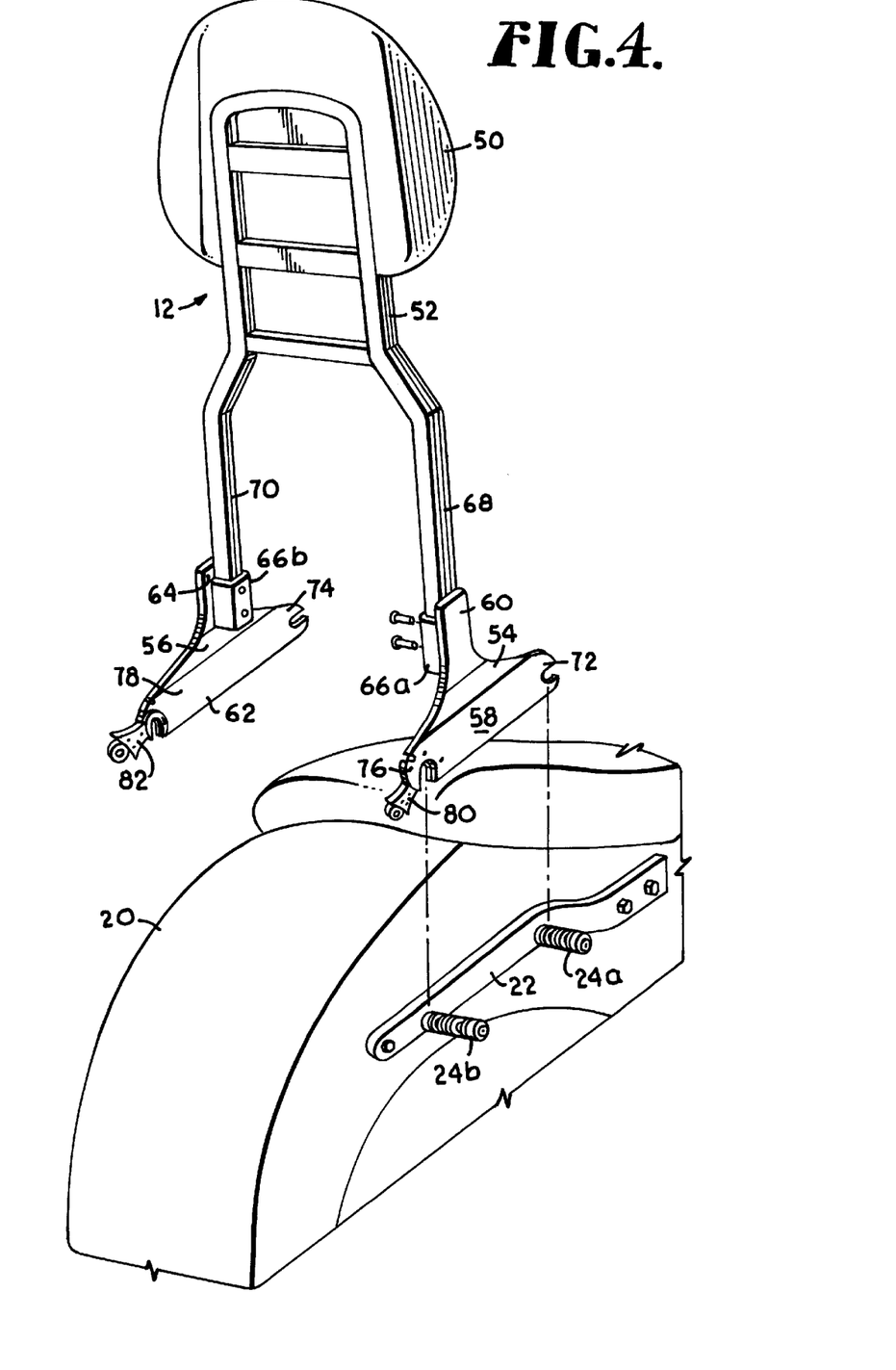
FIG. 4 is a perspective view of the passenger backrest of the motorcycle accessory quick-release attachment assembly of FIG. 1, shown detached from the motorcycle.

As best shown in FIG. 4, motorcycle 18 includes a rear fender 20 having a right-side fender strut 22 and a left-side fender strut (not shown) bolted or otherwise secured to opposite sides of rear fender 20. Installed on the fender struts are a pair of front mounting studs 24a and a pair of rear mounting studs 24b which extend outwardly from the struts. As will be described hereinbelow, mounting studs 24a and 24b are configured to mount passenger backrest 12 and saddlebags 14 and 16 on motorcycle 18.

Configuration of the Mounting Studs

Referring to FIGS. 2 and 3, one of the four mounting studs of assembly 10 is designated generally as reference numeral 24. Mounting stud 24 includes an elongated bolt 26 which, when installed on motorcycle 18, extends all the way through fender strut 22 and is secured in place with a nut 28 screwed onto the threaded end of bolt 26 against the inside surface of fender strut 22. In other embodiments, bolt 26 could be threaded along its entire length, or, could extend all the way through rear fender 20 and be secured in place with nut 28 on the inside surface of rear fender 20. While the mounting studs are preferably secured on either side of the fender struts to provide a stable and convenient location for mounting the accessories, it is contemplated that the mounting studs could be secured to other parts and/or locations of the motorcycle.

Mounted onto bolt 26 between its head 32 and the outside surface offender strut 22 is a spacer tube 30. The inside diameter of spacer tube 30 is slightly greater than the outside diameter of bolt 26 such that spacer tube 30 can be slidingly mounted onto bolt 26 prior to installation. Spacer tube 30 may be formed of any rigid material known in the art including metal, and is preferably formed of stainless or plated steel.

Mounting stud 24 also includes inner and outer mounting rings 34a and 34b mounted onto spacer tube 30 for mounting two different motorcycle accessories. The inside diameter of mounting rings 34a and 34b is slightly greater than the outside diameter of spacer tube 30 such that mounting rings 34a and 34b can be slidingly mounted onto spacer tube 30 prior to installation. Inner and outer mounting rings 34a and 34b each have an annular groove 36a and 36b formed therein which, in the exemplary embodiment, receive passenger backrest 12 and saddlebags 14 and 16, respectively. Mounting rings 34a and 34b may be formed of any rigid material known in the art, and are preferably formed of a polymer such as Delrin plastic to minimize frictional wear and rattling.

Mounting stud 24 further includes a center spacer 38 and inner and outer spacers 40 and 42 which function to capture mounting rings 34a and 34b on spacer tube 30. As best shown in FIG. 2, the inside diameter of center spacer 38 is slightly greater than the outside diameter of spacer tube 30 such that center spacer 38 can be slidingly mounted on spacer tube 30 between mounting rings 34a and 34b prior to installation. In addition, in the illustrated embodiment, inner and outer spacers 40 and 42 are configured to mount on the ends of spacer tube 30 prior to installation. Specifically, inner spacer 40 has a central bore extending therethrough which has a larger diameter portion 44 and a smaller diameter portion 46 forming a ridge 48 therebetween. The inside diameter of inner spacer 40 along larger diameter portion 44 is slightly greater than the outside diameter of spacer tube 30, and the inside diameter of inner spacer 40 along smaller diameter portion 46 is less than the outside diameter of spacer tube 30. As such, the end of spacer tube 30 adjacent inner spacer 40 abuts ridge 48 when inner spacer 40 is mounted on the end of spacer tube 30 and over bolt 26.

It can be seen that the configuration of outer spacer 42 is simply a mirror-image of the configuration of inner spacer 40. Spacers 38, 40 and 42 may be formed of any rigid material including metal, and are preferably formed of stainless steel.

As best shown in FIG. 3, the combined longitudinal length of mounting rings 34a and 34b and spacers 38, 40 and 42 is substantially equal to the distance between bolt head 32 and the outside surface of fender strut 22. As such, mounting rings 34a and 34b are securely held in place on spacer tube 30 so as to provide a stable mount for passenger backrest 12 and saddlebags 14 and 16.

It will be seen that the relatively narrow thickness of the latches of passenger backrest 12 and saddlebags 14 and 16 allow mounting rings 34a and 34b (and thus mounting studs 24a and 24b) to have a relatively short longitudinal length such that mounting studs 24a and 24b do not extend out too far from motorcycle 18. As such, two different motorcycle accessories can be mounted side by side on mounting studs 24a and 24b. Specifically, the longitudinal length of each of mounting rings 34a and 34b ranges from 0.300 inches to 0.325 inches, and the longitudinal length of each of annular grooves 36a and 36b ranges from 0.093 inches to 0.1875 inches. Also, the longitudinal length of mounting rings 34a and 34b and spacers 38, 40 and 42 combined ranges from 01.398 inches to 01.898 inches.

While front mounting studs 24a and rear mounting studs 24b have been described and illustrated hereinabove as having the same configuration, it is preferred that the rear mounting studs include mounting rings which are longitudinally longer than the mounting rings of the front mounting studs. This configuration allows the rear mounting studs to handle the greater load typically placed on the rear mounting studs by, for example, a passenger leaning back against the passenger backrest. In this preferred embodiment, the spacers of the rear mounting studs should preferably be longitudinally shorter than the spacers of the illustrated embodiment such that the overall length of the mounting stud remains unchanged.

As will now be described hereinbelow, in the illustrated embodiment, passenger backrest 12 and saddlebags 14 and 16 are releasably attached to inner and outer mounting rings 34a and 34b of front and rear mounting studs 24a and 24b of motorcycle 18, Configuration and Attachment of the Passenger Backrest Referring to FIG. 4, the passenger backrest of assembly 10 is designated generally as reference numeral 12. Passenger backrest 12 consists of a conventional back support 50 attached to a back support frame 52, as is known in the art, extending upwardly from a right side plate 54 and a left side plate 56. Side plates 54 and 56 may be formed of any rigid material known in the art including metal, and are preferably formed of stainless steel.

Right side plate 54 consists of a lower mounting section 58 with a backrest attachment section 60 extending upwardly therefrom. The configuration of left side plate 56 is simply a mirror-image of the configuration of right side plate 58, having a lower mounting section 62 with a backrest attachment section 64 extending upwardly therefrom. Welded or otherwise secured to the inner surfaces of backrest attachment sections 60 and 64 are receiver brackets 66a and 66b which slidingly receive the right and left support legs 68 and 70 of back support frame 52. Receiver brackets 66a and 66b each have bolt holes punched therethrough which mate with bolt holes punched through support legs 68 and 70 such that back support frame 52 can be slidingly inserted into receiver brackets 66a and 66b and bolted or otherwise secured thereto.

As stated above, passenger backrest 12 is adapted to be releasably attached to front and rear mounting studs 24a and 24b of motorcycle 18. In the illustrated embodiment, lower mounting sections 58 and 62 of side plates 54 and 56 each have forwardly-facing front hooks 72 and 74 which mount on inner mounting rings 34a of front mounting studs 24a and downwardly-facing rear hooks 76 and 78 which mount on inner mounting rings 34a of rear mounting studs 24b. As will be described below a pair of latches 80 and 82 connected to rear hooks 76 and 78 can be rotated from an open position to a closed position to secure rear hooks 76 and 78 to rear mounting studs 24b and thereby attach passenger backrest 12 to motorcycle 18.

It is contemplated that the orientation of the front and rear hooks could be reversed such that the latches could alternatively be connected to the front hooks of the side plates. However, the connection of latches 80 and 82 to rear hooks 76 and 78 as shown in the illustrated embodiment is preferred due to the fact that latches 80 and 82 would be easier to access during the attachment/detachment process Referring to FIGS. 5–10, the right-side latch of passenger backrest 12 is designated generally as reference numeral 80. While the configuration of right-side latch 80 will hereinafter be described in detail, it should be apparent that the configuration of left-side latch 82 is simply a mirror-image of the configuration of right-side latch 80.

Figure 5:
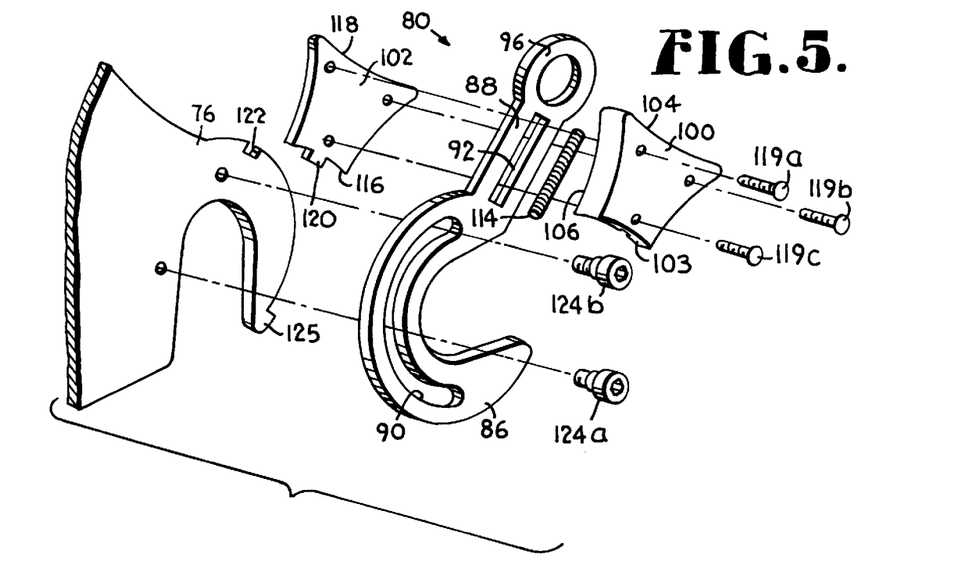
FIG. 5 is an exploded perspective view of the right-side latch of the passenger backrest of FIG. 4.

As best shown in FIG. 5, latch 80 includes a relatively planar "question mark-shaped" latch body 84 consisting of a C-shaped bracket 86 and a handle extension 88 appending therefrom. Bracket 86 has a C-shaped slot 90 formed therein, and handle extension 88 has an elongated slot 92 formed therein. Formed at the end of handle extension 88 is a ring-shaped lock receiver 96 which, in a related aspect of the preferred embodiment described hereinbelow, is designed to optionally receive a padlock to lock passenger backrest 12 to motorcycle 18. Latch body 84 may be formed of any rigid material known in the art including metal, and is preferably formed of stainless steel.

Latch 80 also includes a handle 98 moveably mounted onto latch body 84. Handle 98 consists of a housing 100 which mounts over handle extension 88 and a solid cover plate 102 screwed or otherwise secured thereto.

Figure 6:
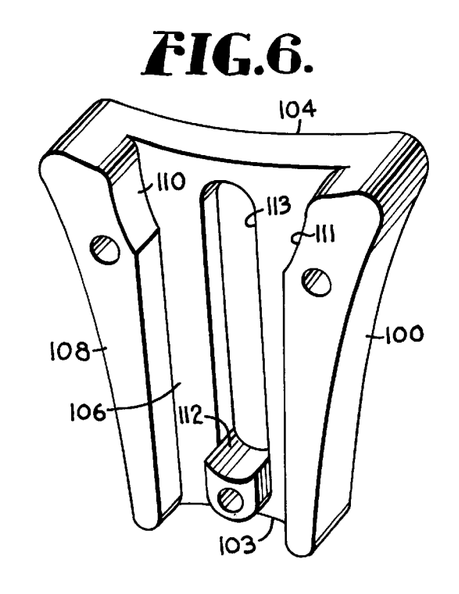
FIG. 6 is an enlarged side view of the housing section of the latch of FIG. 5.
Figure 7:
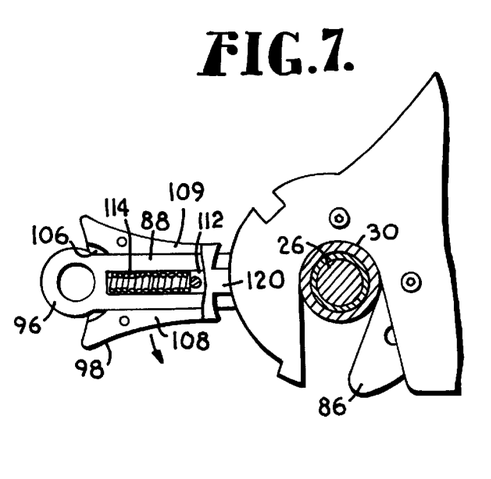
FIG. 7 is an enlarged right-side view of the latch of FIG. 5 shown between the open and closed positions, with a portion of the latch cut away to show the inside thereof
Figure 8:
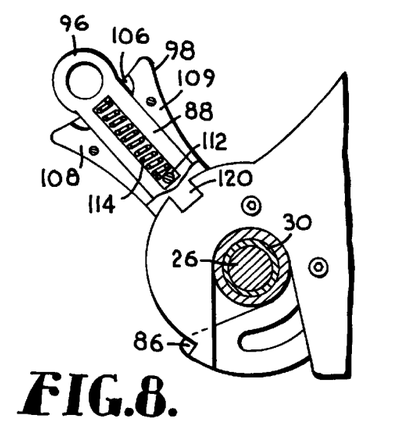
FIG. 8 is an enlarged right-side view of the latch of FIG. 5 shown in the closed position, with a portion of the latch cut away to show the inside thereof
Figure 9:
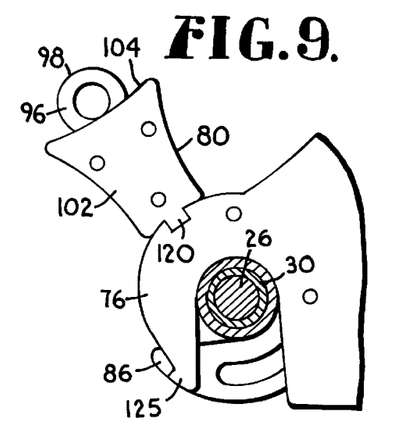
FIG. 9 is an enlarged right-side view of the latch of FIG. 5 shown in the closed position.
Figure 10:
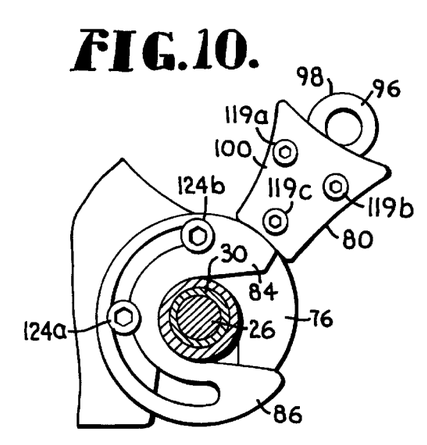
FIG. 10 is an enlarged left-side view of the latch of FIG. 5 shown in the closed position.
Figure 13:
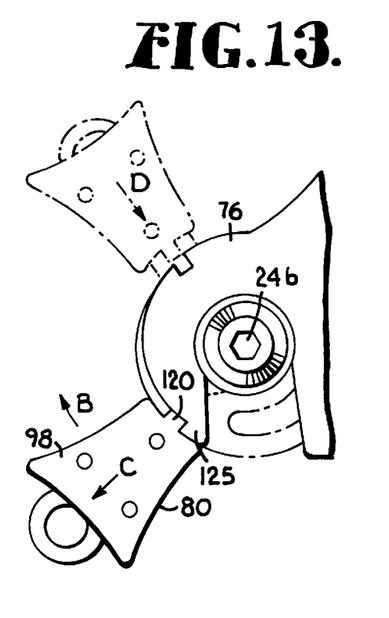
FIG. 13 is an illustration of the rotation of the latch of FIG. 5 from the open position (shown in solid lines) to the closed position (shown in dashed lines).

As best shown in FIG. 6, housing 100 is generally spade-shaped tapering outwardly from a first lower end 103 to a second upper end 104 and has an inner channel 106 for receiving handle extension 88 therein. Inner channel 106 is defined by a first edge 108 and a second edge 109 having chamfered regions 110 and 111 which are suitably sized to receive the lower portion of lock receiver 96. A spring actuator 112 protrudes into inner channel 106 below a shallow milled-out spring receiver region 113 of housing 100. As best shown in FIGS. 7 and 8, handle extension 88 is mounted within housing 100 such that spring actuator 112 extends through the lower end of slot 92. A coil compression spring 114 is positioned within slot 92 along spring receiver region 113 such that it is engaged between spring actuator 112 and the upper surface area of slot 92. It will be seen that spring 114 biases handle 98 in the direction of arrow "D" as illustrated in FIG. 13. It should be noted that chamfered regions 110 and 111 provide a stop to receiver 96 when handle 98 is pulled in the opposite direction of arrow "D" to thereby prevent the dismounting of handle 98 from latch body 84. Housing 100 may be formed of any rigid material known in the art including metal, and is preferably formed of aluminum.

Looking back to FIG. 5, cover plate 102 has a similar configuration to housing 100 in that it is generally spade-shaped tapering outwardly from a first lower end 116 to a second upper end 118. As such, cover plate 102 can be mated with housing 100 and secured thereto with screws 119a, 119b and 119c. Screws 119a and 119b extend through edges 108 and 109 of housing 100 and into cover plate 102. Screw 119c extends through spring actuator 112 of housing 100 and into cover plate 102. Cover plate 102 also has a tab 120 projecting from first lower end 116 which, as will be shown, is positioned to engage in a notch 122 formed in rear hook 76 so as to secure latch 80 to rear hook 76. Cover plate 102 may be formed of any rigid material known in the art including metal, and is preferably formed of stainless steel.

To rotatably connect latch 80 to rear hook 76, a pair of shoulder screws 124a and 124b are provided which extend through slot 90 of bracket 86 and into rear hook 76. The rod portions of shoulder screws 124a and 124b each include a smooth-surfaced portion which extends through slot 90 and a threaded portion which screws into rear hook 76. The width of slot 90 is slightly larger than the outside diameter of shoulder screws 124a and 124b such that the inner surface of slot 90 rides on the smooth-surfaced portion of shoulder screws 124a and 124b when latch 80 is rotated. Thus, it can be seen that slot 90 defines the range of rotational movement of latch 80 with respect to rear hook 76. Shoulder screws 124a and 124b are spaced apart within slot 90 a sufficient amount to accommodate this rotational movement and to stabilize attachment of latch 80 to rear hook 76. In addition, as best shown in FIG. 13, a lip 125 formed along the outer edge of rear hook 76 provides an additional stop to the rotation of latch 80 toward the open position.

Figure 11:
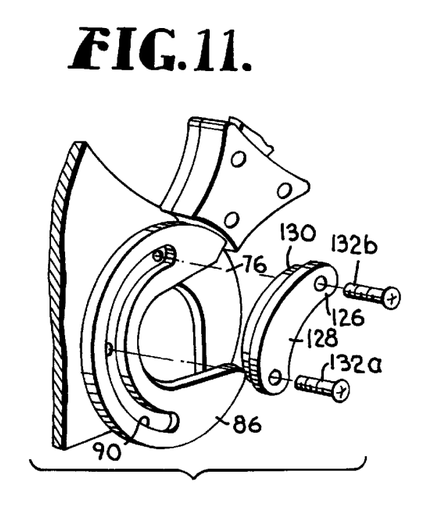
FIG. 11 is an exploded perspective view of an alternative embodiment of the latch of FIG. 5.

An alternative configuration for rotatably connecting latch 80 to rear hook 76 is illustrated in FIG. 11. In this configuration, shoulder screws 124a and 124b are replaced with a crescent-shaped shoulder plate 126 consisting of an outer plate 128 and a central flange 130 extending inwardly from the inner surface of outer plate 128. Flange 130 is positioned such that it can be mounted within slot 90. Shoulder plate 126 is secured to rear hook 76 with a pair of screws 132a and 132b which extend through slot 90 and into rear hook 76. The width of slot 90 is slightly larger than the width of flange 130 such that the inner surface of slot 90 rides on the outside surface of flange 130 when latch 80 is rotated. With this configuration, shoulder plate 126 provides more rotational surface area than shoulder screws 124a and 124b so as to reduce the frictional "wear and tear" placed on any one component.

Figure 12:
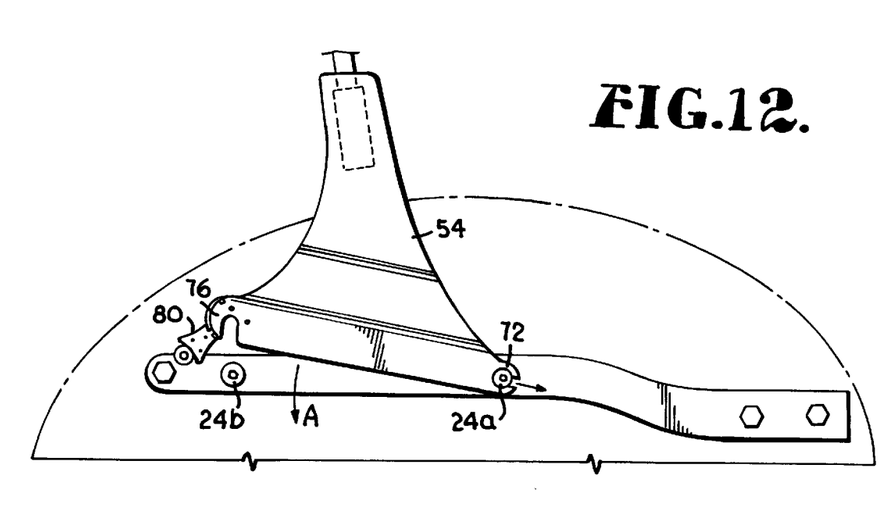
FIG. 12 is an illustration of the mounting of the passenger backrest of FIG. 4 on the mounting studs of FIGS. 2 and 3.

The attachment of passenger backrest 12 to motorcycle 18 will now be described in detail. As illustrated in FIG. 12, passenger backrest 12 is mounted to front and rear mounting studs 24a and 24b by mounting front hooks 72 and 74 on the inner mounting rings of front mounting studs 24a, pivoting right and left side plates 54 and 56 downwardly in the direction of arrow "A", and mounting rear hooks 76 and 78 on the inner mounting rings of rear mounting studs 24b. Then, as illustrated in FIG. 13, rear hooks 76 and 78 are releasably secured to rear mounting studs 24b by rotating latches 80 and 82 from an open position (shown in solid lines) to a closed position (shown in dashed lines) in the direction of arrow "B". As such, passenger backrest 12 is releasably attached to motorcycle 18.

Looking to FIG. 13, it can be seen that when latch 80 is rotated from the open position toward the closed position, tab 120 rides along the outer edge of rear hook 76 which causes handle 98 to move in the direction of arrow "C" against the bias of spring 114 (see FIG. 7). And, when latch 80 reaches the closed position, the bias of spring 114 causes handle 98 to move in the direction of arrow "D" whereby tab 120 engages within notch 122 of rear hook 76 to secure rear hook 76 to rear mounting stud 24b (see FIG. 8).

Of course, to detach passenger backrest 12 from motorcycle 18, rear hooks 76 and 78 are released from rear mounting studs 24b by pulling handle 98 in the opposite direction of arrow "D" to disengage tab 120 from notch 122, and rotating latches 80 and 82 from the closed position to the open position in the opposite direction of arrow "B". Passenger backrest 12 is then dismounted from mounting studs 24a and 24b by dismounting rear hooks 76 and 78 from rear mounting studs 24b, pivoting right and left side plates 54 and 56 upwardly in the opposite direction of arrow "A", and dismounting front hooks 72 and 74 from front mounting studs 24a.

Configuration and Attachment of the Saddlebags

Figure 14:
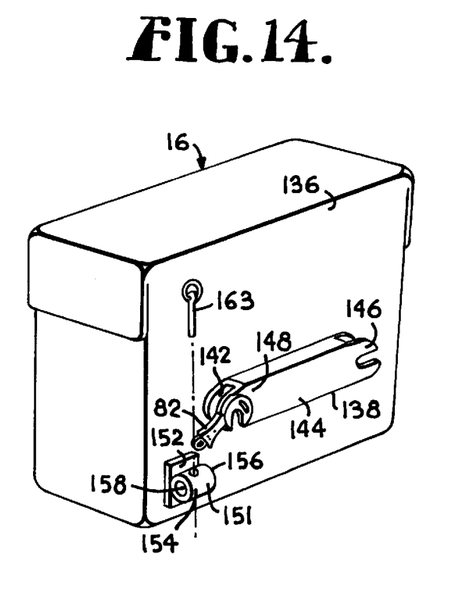
FIG. 14 is a perspective view of the left-side saddlebag of the motorcycle accessory attachment assembly of FIG. 1.

Referring to FIG. 14, the left-side saddlebag of motorcycle 18 is designated generally as reference numeral 16. While the configuration of left-side saddlebag 16 will hereinafter be described in detail, it should be apparent that the configuration of right-side saddlebag 14 is simply a mirror-image of the configuration of left-side saddlebag 16.

Left-side saddlebag 16 consists of a conventional saddlebag 136, as is known in the art, as well as a mounting bracket 138 bolted or otherwise secured thereto. Mounting bracket 138 consists of an inner side plate 142 spaced from an outer side plate 144, wherein inner side plate 142 has bolt holes punched therethrough which mate with bolt holes formed in saddlebag 136. In the illustrated embodiment, saddlebag 136 has a support bracket (not shown) mounted on its inside wall to prevent saddlebag 136 from collapsing, and inner side plate 142 is bolted through saddlebag 136 to this support bracket. Outer side plate 144 has a forwardly-facing front hook 146 which mounts on outer mounting ring 34b of front mounting stud 24a and a downwardly-facing rear hook 148 which mounts on outer mounting ring 34b of rear mounting stud 24b. Mounting bracket 138 may be formed of any rigid material known in the art including metal, and is preferably formed of stainless steel.

A latch 82 rotatably connected to rear hook 148 of outer side plate 144 is provided to releasably secure rear hook 148 to rear mounting stud 24b and thereby attach saddlebag 16 to motorcycle 18. It should be apparent that latch 82 has the same configuration as the left-side latch of passenger backrest 12.

The attachment of left-side saddlebag 16 to motorcycle 18 will now be described in detail. It should be apparent that the attachment of right-saddlebag 14 to motorcycle 18 will be the same as that for left-side saddlebag 16.

First, saddlebag 16 is mounted to front and rear mounting studs 24a and 24b by mounting front hook 146 on the outer mounting ring of front mounting stud 24a, pivoting mounting bracket 138 downwardly, and mounting rear hook 148 on the outer mounting ring of rear mounting stud 24b. Then, rear hook 148 is secured to rear mounting stud 24b by rotating latch 82 from an open position to a closed position. As such, saddlebag 16 is releasably attached to motorcycle 18.

Of course, to detach saddlebag 16 from motorcycle 18, rear hook 148 is released from rear mounting stud 24b by pulling handle 98 to disengage tab 120 from notch 122, and rotating latch 82 from the closed position to the open position. Then, saddlebag 16 is dismounted from front and rear mounting studs 24a and 24b by dismounting rear hook 148 from rear mounting stud 24b, pivoting mounting bracket 138 upwardly, and dismounting front hook 146 from front mounting stud 24a.

It should be noted that saddlebags 14 and 16 optionally include a crossbar receiver 151 bolted or otherwise secured thereto which, as will be seen, is designed to receive a crossbar so as to minimize the lateral movement of saddlebags 14 and 16 with respect to motorcycle 18. Crossbar receiver 151 consists of a flat plate 152 and a receiver tube 154 welded or otherwise secured thereto. Plate 152 has bolt holes punched therethrough which mate with bolt holes formed in the inside support bracket of saddlebag 136. Receiver tube 154 extends from a closed end 156 to an open end 158 and has a pin hole drilled therethrough for receiving a pin to secure the crossbar therein. Crossbar receiver 151 may be formed of any rigid material known in the art including metal, and is preferably formed of mild steel.

Referring to FIG. 1, as stated above, a crossbar 162 is optionally provided which consists of a U-shaped tube having a right insertion end 164 and a left insertion end 166. Right insertion end 164 has a pin hole drilled therethrough which mates with the pin hole of receiver tube 140 of right-side saddlebag 14. Similarly. left insertion end 166 has a pin hole drilled therethrough which mates with the pin hole of the receiver tube of left-side saddlebag 16. In use, the owner of a motorcycle can slidingly insert crossbar 162 into the open ends of the receiver tubes and insert pins 163 through the mated pin holes to securely retain crossbar 162 within the crossbar receivers of saddlebags 14 and 16 to thereby minimize the lateral movement of saddlebags 14 and 16 with respect to motorcycle 18.

Finally, it is contemplated that side plate configurations in addition to that described and illustrated hereinabove could also be used to mount two different motorcycle accessories to the same set of mounting studs. Of course, the specific side plate configuration of the preferred embodiment is particularly well-adapted for this purpose in that the latch is relatively thin working in combination with the outer edge of the rear hooks to allow the mounting of two motorcycle accessories in a side-by-side configuration. Another advantage of this latch design is that the latch handle is readily accessible to the user to allow the motorcycle accessories to be easily attached to and/or detached from the motorcycle.

Locking of the Passenger Backrest and Saddlebags

As will be described hereinbelow, latches 80 and 82 of the preferred embodiment are also configured to allow passenger backrest 12 and saddlebags 14 and 16 to be optionally locked to motorcycle 18.

Figure 15:
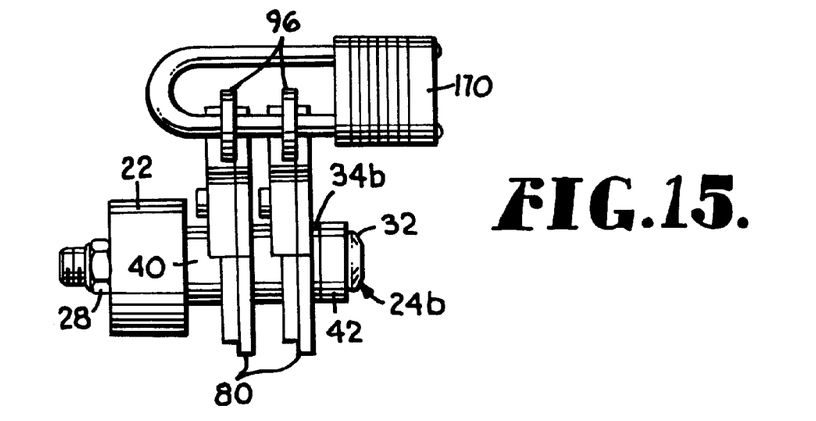
FIG. 15 is an enlarged side view of the right-side latches of the passenger backrest and right-side saddlebag.
Figure 16:
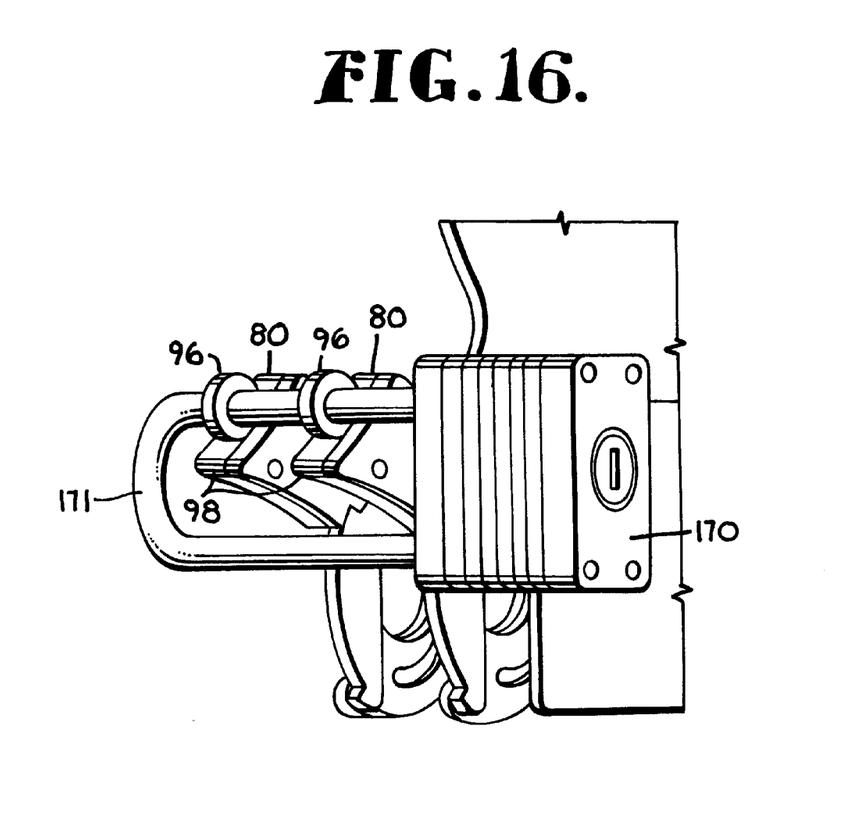
FIG. 16 is an enlarged perspective view of the right-side latches of the passenger backrest and right-side saddlebag.

Referring to FIG. 15, passenger backrest 12 and saddlebags 14 and 16 can be locked to motorcycle 18 by inserting a conventional padlock 170, such as the side combination (¼" shank) padlock sold under the name PRESTOLOCK™, through ring-shaped lock receivers 96 of latches 80. As best shown in FIG. 16, the shank 171 of padlock 170 forms a tight fit within lock receivers 96 to prevent handles 98 from being pulled in the opposite direction of arrow "D" (see FIG. 13) and, thus, prevent the release of rear hooks 76 and 148 from rear mounting studs 24b. As such, passenger backrest 12 and saddlebags 14 and 16 can be optionally locked to motorcycle 18 to guard against theft.

Of course, while the optional locking feature of the illustrated latch configuration has been described in connection with the locking of two different motorcycle accessories to a motorcycle, it is to be understood that this latch configuration could also be used to optionally lock only one motorcycle accessory to a motorcycle.

Although the motorcycle accessory quick-release attachment assembly of the present invention has been described and illustrated with regard to specific embodiments, it should be understood that various modifications of the assembly are possible without departing from the scope of the present invention. Therefore, the present invention is not to be limited to the specific structure or arrangement of parts described and illustrated hereinabove, except insofar as such limitations are included in the following claims.

What is claimed is:

1. A motorcycle accessory attachment assembly, comprising:
    (a) at least one front mounting stud and at least one rear mounting stud adapted to be installed on a motorcycle, wherein each of said front and rear mounting studs has an inner mounting ring and all outer mounting ring mounted thereon; and
    (b) first and second motorcycle accessories adapted to be simultaneously attached to and detached from said motorcycle without the use of tools, wherein each of said motorcycle accessories comprises:
        (i) at least one front hook configured to be mounted on one of said inner and outer mounting rings of said front mounting stud;
        (ii) at least one rear hook configured to be mounted on one of said inner and outer mounting rings of said rear mounting stud; and
        (iii) at least one latch connected to said rear hook, wherein said latch is moveable between a closed position whereby said rear hook is secured to said rear mounting stud and an open position whereby said rear hook can be dismounted from said rear mounting stud.

2. The motorcycle accessory attachment assembly of claim 1 wherein said front and rear mounting studs are bolted to a fender of said motorcycle.

3. The motorcycle accessory attachment assembly of claim 1 wherein said latch is configured to fixedly engage with said rear hook when said latch in said closed position to thereby secure said rear hook to said rear mounting stud.

4. The motorcycle accessory attachment assembly of claim 3 wherein said latch is configured to receive a lock when said latch is in said closed position to prevent disengagement of said latch and said rear hook and thereby prevent detachment of said motorcycle accessory from said motorcycle.

5. The motorcycle accessory attachment assembly of claim 1 wherein said latch has a tab extending therefrom and said rear hook has a notch formed therein, whereby said tab fixedly engages within said notch when said latch is in said closed position to thereby secure said rear hook to said rear mounting stud.

6. The motorcycle accessory attachment assembly of claim 5 wherein said latch has a lock receiver appending therefrom which defines an opening for receiving a lock, whereby said lock can be inserted into said lock receiver when said latch is in said closed position to prevent disengagement of said tab from said notch and thereby prevent detachment of said motorcycle accessory from said motorcycle.

7. The motorcycle accessory attachment assembly of claim 1 wherein said latch is lockable in said closed position to prevent detachment of said motorcycle accessory from said motorcycle.

8. A motorcycle accessory attachment assembly comprising at least one motorcycle accessory adapted to be releasably attached to a motorcycle without the use of tools and first and second means for mounting said at least one motorcycle accessory to said motorcycle, wherein said motorcycle accessory comprises a first hook configured to be mounted on said first mounting means, a second hook configured to be mounted on said second mounting means, and means for releasably latching said second hook to said second mounting means to thereby attach said motorcycle accessory to said motorcycle.

9. The motorcycle accessory attachment assembly of claim 8 comprising first and second motorcycle accessories adapted to be releasably attached to said motorcycle without the use of tools.

10. The motorcycle accessory attachment assembly of claim 8 wherein said latching means is lockable to prevent detachment of said motorcycle accessory from said motorcycle.

11. A motorcycle, comprising:
(a) at least one fender having a front end and a rear end;
(b) at least one front mounting stud bolted to the front end of said fender, wherein said front mounting stud has an inner mounting ring and an outer mounting ring mounted thereon;
(c) at least one rear mounting stud bolted to the rear end of said fender, wherein said rear mounting stud has an inner mounting ring and an outer mounting ring mounted thereon; and
(d) first and second motorcycle accessories adapted to be simultaneously attached to and detached from said motorcycle without the use of tools, wherein each of said motorcycle accessories comprises:
   (i) at least one front hook configured to be mounted on one of said inner and outer mounting rings of said front mounting stud;
   (ii) at least one rear hook configured to be mounted on one of said inner and outer mounting rings of said rear mounting stud; and
   (iii) at least one latch connected to said rear hooks, wherein said latch is moveable between a closed position whereby said rear hook is secured to said rear mounting stud and an open position whereby said rear hook can be dismounted from said rear mounting stud.

12. The motorcycle of claim 11 wherein each of said motorcycle accessories is selected from the group consisting of a passenger backrest, saddlebags, a luggage rack, and a travel trunk.

13. The motorcycle of claim 11 wherein said latch is lockable in said closed position to prevent detachment of said motorcycle accessory from said motorcycle.

\* \* \* \* \*

UNITED STATES PATENT AND TRADEMARK OFFICE
CERTIFICATE OF CORRECTION

PATENT NO.    : 6,347,804 B1
DATED         : February 19, 2002
INVENTOR(S)   : Michael Seibel It is certified that error appears in the above-identified patent and that said Letters Patent is hereby corrected as shown below:

Column 4,
Line 27, delete "offender" and insert -- of fender -- therefor.

Column 10,
Line 20, delete "all outer" and insert -- an outer -- therefor.

Column 12,
Line 13, delete "hooks" and insert -- hook -- therefor.

Signed and Sealed this

Eighth Day of April, 2003

JAMES E. ROGAN
*Director of the United States Patent and Trademark Office*